US008655918B2

(12) United States Patent
Chitnis et al.

(10) Patent No.: US 8,655,918 B2
(45) Date of Patent: Feb. 18, 2014

(54) SYSTEM AND METHOD OF TRANSFORMING DATA FOR USE IN DATA ANALYSIS TOOLS

(75) Inventors: Upendra Chitnis, New York, NY (US); Christoph Lingenfelder, Poughkeepsie, NY (US); Edwin Peter Dawson Pednault, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 11/924,840

(22) Filed: Oct. 26, 2007

(65) Prior Publication Data

US 2009/0112927 A1      Apr. 30, 2009

(51) Int. Cl.
*G06F 7/00*      (2006.01)
(52) U.S. Cl.
USPC .......................................... 707/796; 705/7.12
(58) Field of Classification Search
USPC ............................. 707/1–6, 796; 705/7; 703/2
See application file for complete search history.

(56) References Cited

U.S. PATENT DOCUMENTS

| 6,865,573 | B1* | 3/2005 | Hornick et al. ............... 707/748 |
| 7,003,560 | B1* | 2/2006 | Mullen et al. .................. 709/223 |
| 7,389,211 | B2* | 6/2008 | Abu El Ata et al. .............. 703/2 |
| 7,680,759 | B1* | 3/2010 | Coley et al. ............ 707/999.001 |
| 2004/0015783 | A1* | 1/2004 | Lennon et al. ................ 715/523 |
| 2006/0136479 | A1* | 6/2006 | Fan et al. ....................... 707/102 |
| 2006/0235899 | A1* | 10/2006 | Tucker .......................... 707/200 |
| 2008/0059437 | A1* | 3/2008 | Nagappan ........................ 707/3 |
| 2008/0183766 | A1* | 7/2008 | Weston et al. ................ 707/200 |
| 2009/0018996 | A1* | 1/2009 | Hunt et al. ......................... 707/2 |
| 2009/0037363 | A1* | 2/2009 | Kozlov et al. ..................... 707/1 |

* cited by examiner

*Primary Examiner* — Pierre Vital
*Assistant Examiner* — Christopher J Raab
(74) *Attorney, Agent, or Firm* — Whitham Curtis Christofferson & Cook, PC; Daniel P. Morris

(57) ABSTRACT

A process of transforming data residing in databases, such as relational databases, into forms suitable as input to data analysis tools, such as predictive modeling tools includes the steps of defining a business process problem to be solved and identifying data requirements. For example, the business process problem may relate to predicting a customer's propensity to make purchases in the future or a store's requirements for inventory in the future. In the process, a computer implemented method is used for automatically transforming data for data analysis such as predictive modeling. Database metadata that describe database tables, their interrelationships, dimensional information, fact tables and measures are accessed. A mining transformation profile is created to encapsulate aggregations and transformation on data stored in relational databases in order to convert the data to forms suitable for predictive mining tools. The mining transformation profile specifies data transformations relative to the data base metadata. Executable data transformation codes is then generated from the database metadata and the mining transformation profile. Execution of this code results in aggregation and transformation of data residing in a database for input to a data analysis tool such as a predictive modeling tool. The data transformation code can be used by, for example, the predictive modeling tool to generate an output that provides a solution to a business process problem.

20 Claims, 11 Drawing Sheets

Keys Fields for Mining Data:
    Store Id, Product Id, Week Id

Explanatory Fields:
    SUM(Number of Items)
    SUM(Number of Items) last week
    SUM(Number of Items) Year-To-Week
    SUM(Number of Items) by Day of Week SUM(Number of Items) by Product Department
    SUM(Number of Items) by Product Department, last week
    SUM(Number of Items) by Product Department, Year-To-Week
    SUM(Number of Items) by Product Department, Day of Week SUM(Number of Items) by Store District, Product Department
    SUM(Number of Items) by Store District, Product Department, last week
    SUM(Number of Items) by Store District, Product Department,
                     Year-To-Week
    SUM(Number of Items) by Store District, Product Department,
                     Day of Week

Target Fields:
    SUM(Number of Items) 1 week hence
    SUM(Number of Items) 2 weeks hence
    ...
    SUM(Number of Items) 16 weeks hence

Figure 5

```
WITH TEMPPROFILE (STORE_ID, PD_ID, TIME_ID, TOT_NUMITM, SUNDAY_NUMITM)
AS
(
SELECT
        STORE.STORE_ID,   PD.PD_ID,   TIME.TIME_ID,  } 2
        SUM (FCT.NUM_ITM_SOLD),
        SUM (CASE DAY_OF_WK WHEN 1 THEN FCT.NUM_ITM_SOLD ELSE NULL END)
        --.SIMILARLY DAYS OF WEEK MEASURES CAN BE CREATED FOR MONDAY, TUESDAY ETC.
FROM
        MARTS.PD  PD,
        MARTS.STORE  STORE,      } 3
        MARTS.TIME  TIME,
        MARTS.SALES_FACT  FCT
WHERE
        PD.PD_ID = FCT.PD_ID
        AND STORE.STORE_ID = FCT.STORE_ID    } 4
        AND TIME.TIME_ID = FCT.TIME_ID
        -- YEAR TYPE TIME ID
        AND TIME.TIME_TP_ID = 1

GROUP BY
        STORE.STORE_ID ,
        PD.PD_ID ,              } 5
        TIME.TIME_ID)

SELECT

-- KEYS FIELDS FOR MINING DATA:

FCT.STORE_ID            } 6
        ,FCT.PD_ID
        ,FCT.TIME_ID

--EXPLANATORY FIELDS:

--SUM(NUMBER OF ITEMS)
        ,FCT.TOT_NUMITM

--SUM(NUMBER OF ITEMS) LAST WEEK
        ,SUM(FCT.TOT_NUMITM)  OVER(  ORDER   BY   TIME.WK_OF_CDR_YR   ROWS
BETWEEN 1 PRECEDING AND 1 PRECEDING)

--SUM(NUMBER OF ITEMS) YEAR-TO-WEEK
        ,SUM(FCT.TOT_NUMITM)  OVER(  ORDER   BY   TIME.WK_OF_CDR_YR   ROWS
        UNBOUNDED PRECEDING )

--SUM(NUMBER OF ITEMS) BY DAY OF WEEK
        ,SUNDAY_NUMITM

--SUM(NUMBER OF ITEMS) BY PRODUCT DEPARTMENT
        ,SUM(FCT.TOT_NUMITM) OVER( PARTITION BY PD.PD_DEPT_NM )

--SUM(NUMBER OF ITEMS) BY PRODUCT DEPARTMENT, LAST WEEK
```

Braces 1 encloses the entire block; 7 encloses the explanatory fields section.

Figure 7a

```
        ,SUM(FCT.TOT_NUMITM) OVER( PARTITION BY PD.PD_DEPT_NM   ORDER BY
        TIME.WK_OF_CDR_YR ROWS BETWEEN 1 PRECEDING AND 1 PRECEDING )

--SUM(NUMBER OF ITEMS) BY PRODUCT DEPARTMENT, YEAR-TO-WEEK
        ,SUM(FCT.TOT_NUMITM) OVER( PARTITION BY PD.PD_DEPT_NM   ORDER BY
        TIME.WK_OF_CDR_YR ROWS UNBOUNDED PRECEDING )

--SUM(NUMBER OF ITEMS) BY PRODUCT DEPARTMENT, DAY OF WEEK
        ,SUM(SUNDAY_NUMITM) OVER( PARTITION BY PD.PD_DEPT_NM )

--SUM(NUMBER OF ITEMS) BY STORE DISTRICT, PRODUCT DEPARTMENT
        ,SUM(FCT.TOT_NUMITM)   OVER(   PARTITION   BY   PD.PD_DEPT_NM   ,
        STORE.STORE_DIS_NM )

--SUM(NUMBER OF ITEMS) BY STORE DISTRICT, PRODUCT DEPARTMENT, LAST WEEK
        ,SUM(FCT.TOT_NUMITM)   OVER(   PARTITION   BY   PD.PD_DEPT_NM   ,
        STORE.STORE_DIS_NM ORDER BY TIME.WK_OF_CDR_YR ROWS  BETWEEN 1
        PRECEDING AND 1 PRECEDING )

--SUM(NUMBER OF ITEMS) BY STORE DISTRICT, PRODUCT DEPARTMENT,   YEAR-TO-
WEEK
        ,SUM(FCT.TOT_NUMITM)   OVER(   PARTITION   BY   PD.PD_DEPT_NM   ,
        STORE.STORE_DIS_NM ORDER BY TIME.WK_OF_CDR_YR ROWS UNBOUNDED
        PRECEDING )

--SUM(NUMBER OF ITEMS) BY STORE DISTRICT, PRODUCT DEPARTMENT,DAY OF WEEK
        ,SUM(SUNDAY_NUMITM)              OVER(PARTITION             BY
        PD.PD_DEPT_NM,STORE.STORE_DIS_NM )

--TARGET FIELDS:

--SUM(NUMBER OF ITEMS) 1 WEEK HENCE
        ,SUM(FCT.TOT_NUMITM) OVER( ORDER BY  TIME.WK_OF_CDR_YR  ROWS
        BETWEEN 1 FOLLOWING AND 1 FOLLOWING )

--SUM(NUMBER OF ITEMS) 2 WEEKS HENCE
        ,SUM(FCT.TOT_NUMITM) OVER( ORDER BY  TIME.WK_OF_CDR_YR ROWS    1
        FOLLOWING)

--SUM(NUMBER OF ITEMS) 16 WEEKS HENCE
        ,SUM(FCT.TOT_NUMITM) OVER( ORDER BY  TIME.WK_OF_CDR_YR ROWS   16
        FOLLOWING )
FROM
        MARTS.PD PD,
        MARTS.STORE STORE,
        MARTS.TIME TIME,
        TEMPPROFILE FCT
WHERE
        PD.PD_ID = FCT.PD_ID
        AND STORE.STORE_ID = FCT.STORE_ID
        AND TIME.TIME_ID = FCT.TIME_ID
```

Figure 7b

Keys Fields for Mining Data:
    Customer Id, Month Id

Explanatory Fields:
    Last Date in Month – (MAX(Transaction Date) last 12 months)

COUNT (DISTINCT Time Id)
    COUNT (DISTINCT Time Id) last 3 Months
    COUNT (DISTINCT Time Id) last 6 Months
    COUNT (DISTINCT Time Id) last 12 Months SUM(Sales Amount)
    SUM(Sales Amount) last 3 Months
    SUM(Sales Amount) last 6 Months
    SUM(Sales Amount) last 12 Months SUM(Sales Amount) by Product Department, last 12 Months

Target Fields:
    SUM(Sales Amount) next Month
    SUM(Sales Amount) by Product Department, next 12 Months

Figure 8

SQL

WITH TEMPPROFILE (CUST_ID, TIME_ID, RECENT_VISIT, FREQUENCY, TOT_SALES_AMT, DEPT1_SALES_AMT )
AS
(
SELECT

CUST.CUST_ID, TIME.TIME_ID
    ,SUM(FCT.SALES_AMT)
    ,MAX(TIME.DAY_OF_CDR_YR)
    ,COUNT(TIME.DAY_OF_CDR_YR)
    ,SUM(CASE PD_DEPT_NM WHEN 'DEPT1'
        THEN SALES_AMT ELSE NULL END)
--.... SIMILARLY MEASURES CAN BE GENERATED
--FOR OTHER DAYS OF --WEEK

FROM
    MARTS.PD PD
    ,MARTS.CUST CUST
    ,MARTS.TIME TIME
    ,MARTS.SALES_FACT FCT
WHERE
    PD.PD_ID = FCT.PD_ID
    AND CUST.CUST_ID = FCT.CUST_ID
    AND TIME.TIME_ID = FCT.TIME_ID
    AND TIME.TIME_TP_ID = 1

GROUP BY
    CUST.CUST_ID
    ,PD.PD_ID
    ,TIME.TIME_ID

)
SELECT

--KEYS FIELDS FOR MINING DATA:

FCT.CUST_ID, FCT.TIME_ID

--EXPLANATORY FIELDS:
--LAST DATE IN MONTH – (MAX(TRANSACTION DATE) LAST 12 MONTHS)
    ,RECENT_VISIT

--COUNT (DISTINCT TIME ID)
    ,FREQUENCY

--COUNT (DISTINCT TIME ID) LAST 3 MONTHS
    ,SUM(FREQUENCY) OVER( ORDER BY TIME.CDR_MO ROWS 2 PRECEDING )

--COUNT (DISTINCT TIME ID) LAST 6 MONTHS
    ,SUM(FREQUENCY) OVER( ORDER BY TIME.CDR_MO ROWS 5 PRECEDING )
--COUNT (DISTINCT TIME ID) LAST 12 MONTHS
    ,SUM(FREQUENCY) OVER(

Figure 9a

```
                ORDER BY TIME.CDR_MO ROWS 11 PRECEDING  )

,SUM(DEPT1_SALES_AMT) OVER(
        ORDER BY TIME.CDR_MO ROWS 11 PRECEDING  )

--SUM(SALES AMOUNT)
,TOT_SALES_AMT

--SUM(SALES AMOUNT) LAST 3 MONTHS
,SUM(TOT_SALES_AMT) OVER( ORDER BY TIME.CDR_MO ROWS 2 PRECEDING  )

--SUM(SALES AMOUNT) LAST 6 MONTHS
        ,SUM(TOT_SALES_AMT) OVER( ORDER BY TIME.CDR_MO ROWS 5 PRECEDING )

--SUM(SALES AMOUNT) LAST 12 MONTHS
        ,SUM(TOT_SALES_AMT) OVER( ORDER BY TIME.CDR_MO ROWS 11 PRECEDING )

--TARGET FIELDS

--SUM(SALES AMOUNT) NEXT MONTH
        ,SUM(TOT_SALES_AMT) OVER(ORDER BY TIME.CDR_MO ROWS BETWEEN 1 FOLLOWING AND 1 FOLLOWING)

--SUM(SALES AMOUNT) BY PRODUCT DEPARTMENT, NEXT 12 MONTHS
        ,SUM(TOT_SALES_AMT) OVER(ORDER BY TIME.CDR_MO ROWS 11 FOLLOWING )

FROM
        MARTS.CUST  CUST,
        MARTS.TIME  TIME,
        TEMPPROFILE FCT
WHERE
        CUST.CUST_ID = FCT.CUST_ID
        AND TIME.TIME_ID = FCT.TIME_ID
        AND TIME.TIME_TP_ID = 1
```

SYSTEM AND METHOD OF TRANSFORMING DATA FOR USE IN DATA ANALYSIS TOOLS

FIELD OF THE INVENTION

The field of the invention is directed to an automated process for generation of data transformation code as output based on high-level input specifications of desired transformations which are more natural for statisticians and data analysts to provide.

BACKGROUND OF THE INVENTION

Currently, database administrators and data analysts are required to work closely together to transform and analyze data in relational databases. Together, they must go through a process involving several iterations of meetings, ad hoc structured query language (SQL) and extract-transform-load (ETL) scripting, exporting data to proprietary data mining tools, and using those tools to build predictive models. Once the models have been built, they must be imported back to a database environment for deployment. Often the analysts that create the predictive models do not have the knowledge and skills necessary to write the data transformation code themselves, which requires familiarity with ETL and SQL tools as well as the relational schema of the database which contains the raw data.

FIG. 1 illustrates a conventional related art method of transforming data residing in relational databases into forms suitable as input to predictive modeling tools. Referring to FIG. 1, at Step 1 a business expert and a data analyst work together to define a business problem to be solved. At Step 2 a team or other group of persons defines the data requirements. Step 2 is typically performed by a data analyst, a business expert, and an information technology (IT) person. At Steps 3 through 5 the team or group of persons carry out an iterative process where, for example, an analyst and an IT person work together to prepare relational data for input to a modeling tool. An analyst iteratively builds a model in Steps 6 and 7. The model is then deployed in step 8 with the help of an IT person.

These method steps demand a very high degree of interaction among IT people, data analysts, and business experts. In most cases, no single person possesses all of the necessary expertise to carry out the process on their own. A significant amount of interpersonal communication and coordination must therefore take place, which can introduce significant delays in the process. In addition, many of the method steps must be carried out manually and are quite time consuming, which further increases delays.

There are a great many drawbacks to this process. First, the data preparation step involves an analyst communicating his or her requirements to a database administrator, and then having the database administrator coding the data transformations and making the resulting transformed data suitable for mining. Information required for coding the data transformations must be drawn from several sources including metadata in relational and online analytical processing (OLAP) repositories, schema knowledge in the minds of the database administrators, and modeling knowledge in the minds of analysts. The time spent "preparing data" can be as high as 80-90% of the total time spent in conducting predictive model projects. Second, manual coding of data transformations is extremely complex and error prone. Third, no existing tools provide process automation for data transformations to support predictive modeling and model deployment.

Rosella data mining software available from Scion Analytics makes use of star schemas in predictive modeling. However, Rosella only appears to allow dimension tables to be joined to fact tables. Rosella does not perform aggregations.

SUMMARY OF THE INVENTION

The present invention provides systems and methods for transforming data, for example, stored in a database into a form suitable as input to a data analysis tool, such as, for example, a predictive modeling tool. The data in the database can be in relational or non-relational form (i.e., the invention allows transformation of data from relational databases as well as other database into a form usable by a variety of targets such as mining models, predictive modeling tools, or other data analysis tools. The invention seeks to leverage relational, online analytical processing (OLAP), and mining metadata information to automatically generate executable code for data transformation.

According to the present invention the process is performed on a computer (also referred to as a processor) for transforming data into a form suitable as input to a data analysis tool. Under computer readable instructions, the database metadata is accessed to ascertain the database tables and their interrelationships. A mining transformation profile is accessed that describes the input fields and target fields to be provided to the predictive modeling tool. Then data transformation code that is executable by the database is generated for transforming data according to the database metadata and the mining transformation profile.

BRIEF DESCRIPTION OF THE DRAWINGS

FIG. 5 is a retail sales forecasting mining profile based on the exemplary embodiment of FIG. 3.

FIGS. 7a-7b show exemplary SQL data transformation code for retail sales forecasting mining profile generated based on FIGS. 3-6.

FIG. 8 is a customer propensity mining profile according to a second embodiment of the invention.

FIGS. 9a-9b show exemplary SQL data transformation code for customer propensity mining profile.

DETAILED DESCRIPTION OF PREFERRED EMBODIMENTS

Figure 1:
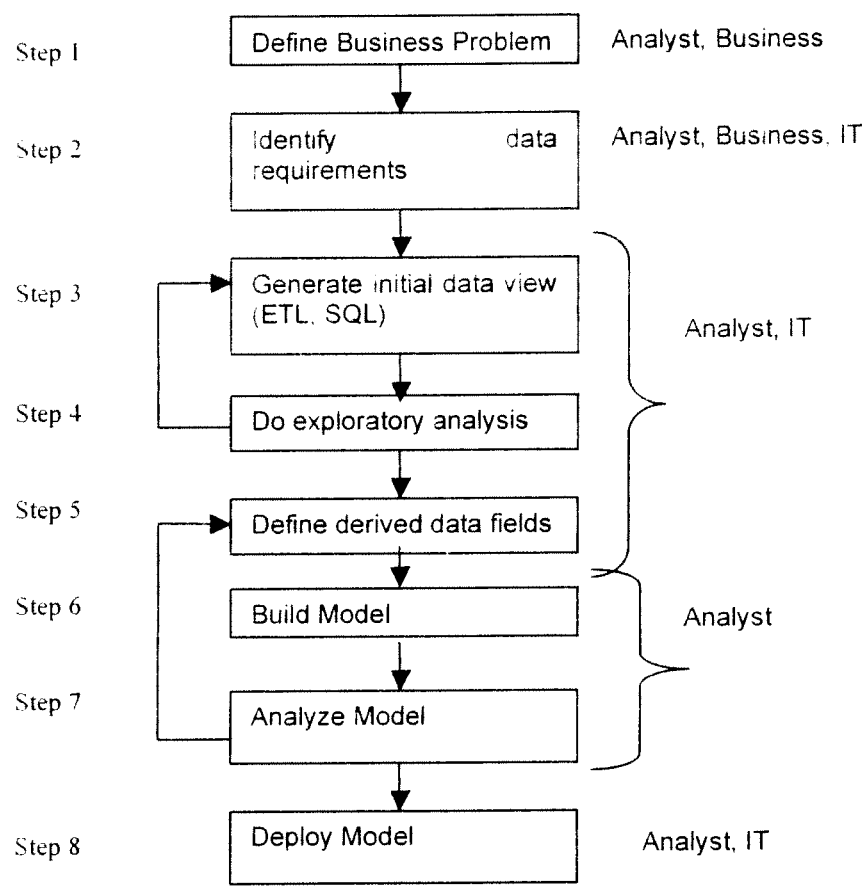
FIG. 1 is a flow chart of the conventional method steps of aggregation and transformation of data that resides in relational databases into forms suitable as input to predictive modeling tools.

It is to be understood that the present invention is not limited to the specific examples described herein and/or depicted by the attached drawings, and that other configurations and arrangements embodying or practicing the present invention can, upon reading this description, be readily implemented by persons skilled in the arts pertaining to the invention.

In the drawings, like numerals appearing in different drawings, either of the same or different embodiments of the invention, reference functional or system blocks that are, or may be, identical or substantially identical between the different drawings.

It is to be understood that the various embodiments of the invention, although different, are not necessarily mutually exclusive. For example, a particular feature, function, act or characteristic described in one embodiment may, within the scope of the invention, be included in other embodiments.

Further, it is to be understood that the terminology used herein is not limiting and, instead, is only for purposes of ease of reference.

Further, it is to be understood that functions and operations shown or described as separate blocks are not, unless otherwise specified or clear from the context, necessarily performed at separate times, or on separate computational units, and operations described or depicted as being separate may be implemented or modeled as a single block.

Further, as will be understood by persons skilled in the art upon reading this description, certain well-known methods, arrangements, acts and operations of SQL, OLAP, LUW, cube models, etc. are omitted, or are not described in detail, so as to better focus on, and avoid obscuring the novel features, combinations, and structures of the present invention.

The present invention includes various functional blocks, acts, steps and/or operations (collectively "operations"), which will be described below. The operations can be embodied in machine-executable instructions, which may be stored on a machine-readable medium, which can be used to cause a general-purpose or special-purpose processor or computer (computer and processor being used interchangeably herein) programmed with the instructions to perform the operations.

Figure 2:
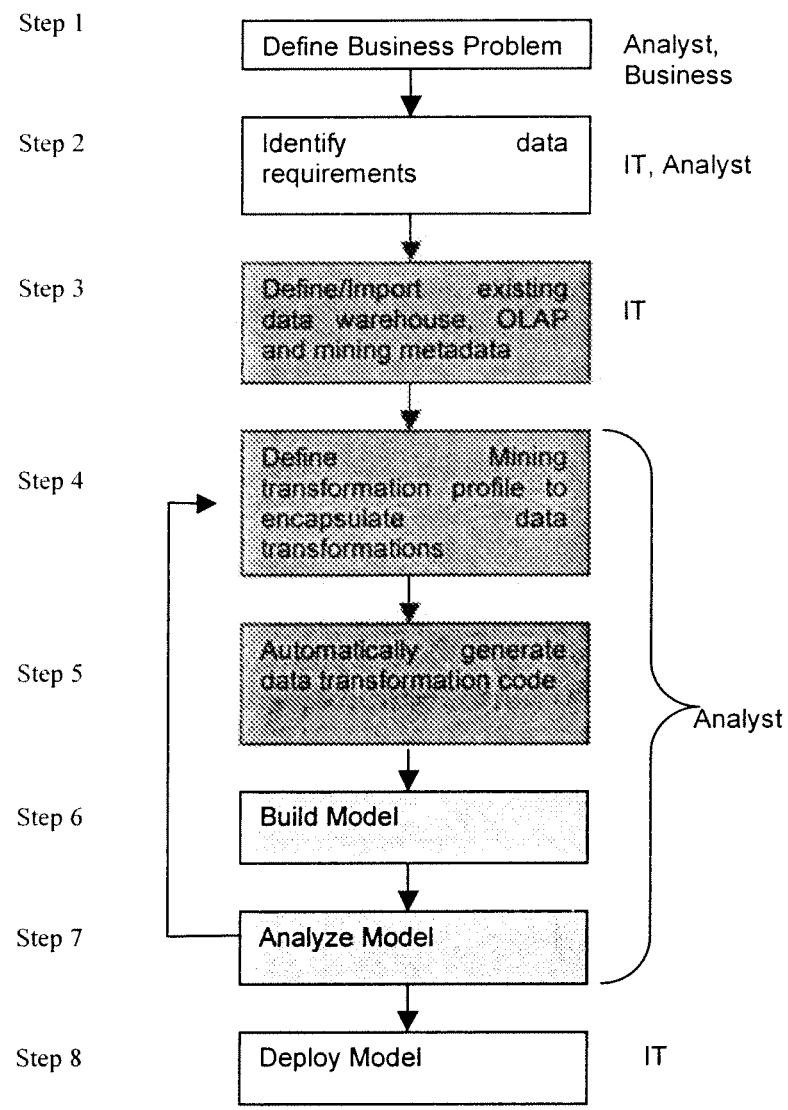
FIG. 2 is a flow chart of the inventive method of aggregation and transformation of data residing in relational databases into forms suitable as input to predictive modeling tools.

FIG. 2 shows a method according to the present invention for transforming data stored in database (e.g., a relational database or other database) into a form suitable as input to a data analysis tool such as a predictive modeling tool. The invention seeks to leverage relational, OLAP, and mining metadata information to automatically generate executable code for data transformation. Contrasting FIG. 1 and FIG. 2, it can be seen that the new steps, with respect to conventional methods, are steps 3, 4, and 5. In addition, it can be seen by comparing the return pathways on the left and the brackets on the right of both figures that the invention requires fewer iterations between IT and analysts, is less prone to mistakes caused by coding due to the automated generation of transformations, and provides analysts with more control over the processes. Step 3 involves accessing existing (or creating new) database metadata that describes the database tables, their interrelationships, dimensional information, hierarchies, fact tables, and measures. There are several tools and repositories in the relational data base environment that store such metadata information. DB2 Cube Views component of IBM DB2 Data Warehouse Edition (DB2 DWE) can store multi-dimensional information such as Cube Model, Hierarchy, Facts, and Measure, etc. Similarly, SQL Warehousing component of IBM DB2 DWE can store ETL (Extract, Transform, Load) information. Step 4 involves creating a mining transformation profile. The mining transformation profile is a novel and important aspect of the present invention, and is not employed in other systems known to the applicant. A mining transformation profile specifies desired data transformations relative to database metadata defined in step 3. It encapsulates the aggregations and transformations on data stored in relational databases in order to convert it to forms suitable for predictive modeling tools. A Mining Transformation Profile refers to and/or reuses the relational and multidimensional metadata from step 3. Examples of mining transformation profiles are described in the retail sales forecasting scenario and in the subsequent customer propensity modeling scenario, both presented below. The database metadata and the Mining Transformation Profile defined in steps 3 and 4 are used in step 5 to generate data transformation code executable by the database or an add-on application. Execution of this code will result in the aggregation and transformation of the data residing in the database to a form suitable for input to a data analysis tool such as predictive modeling tools.

The proposed new method, particularly as defined in steps 3-5, has the following, as well as other, benefits. First, they hide the complexity of relational database tables and their relationships (in the case when data from a relational database is being transformed), thereby enabling analysts to define data transformations for predictive modeling using a specification mechanism (i.e., the mining transformation profile) that is easy for them to understand. Second, they enable the creation of tools and solutions to automatically generate executable code for data aggregation and transformation by leveraging existing metadata, such as OLAP, ELT and mining metadata in relational databases as well as other databases. Third, they enable the creation of predictive modeling templates from industry standard data models such as the IBM Banking Data Warehouse Model, the IBM Retail Data Warehouse Model, etc.

EXAMPLES

Retail Sales Data Mart—The following example illustrates how the new method steps can be used in the context of retail sales data mart. The following example is exemplary only. The invention is generally applicable to a wide range of scenarios. The example illustrates specification of two mining transformation profiles, retail sales forecasting and customer propensity. Both transformation profiles are based on the same retail sales data mart schema. The retail sales data mart stores sales information such as number of items sold, and sales amount by customer, time, store, and product dimensions. The data mart schema is explained in the step 3. As illustrated in this example the same database metadata is used in specifying more than one mining transformation profile.

With reference to FIG. 2, Step 1 is to define the business problem. In this example, the first business problem is to predict future sales of each item at each store in a retail chain so that suitable quantities of goods can be ordered in advance to ensure that enough stock is available to meet forecasted demand. A second business problem is related to customer propensity, e.g., predicting customers likelihood of making purchases in the future.

Step 2 of FIG. 2 is directed to identifying data requirements. In this example, the sales forecasts are to be made based on previous sales history of each item at each store. Similarly the customer propensity forecasting is to be made based on previous purchase history of a customer by time. The retail sales data mart schema can store data required for both the mining profiles.

Figure 3:
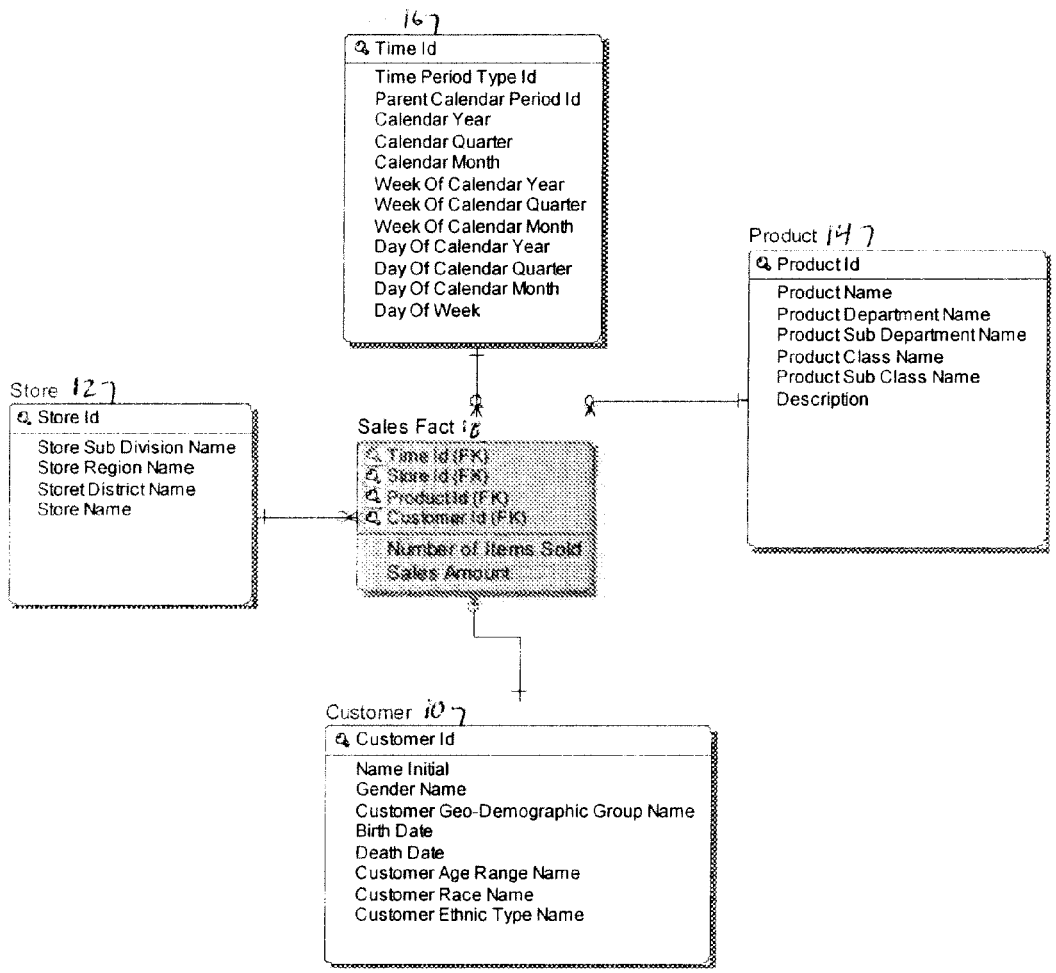
FIG. 3 is a purchase profile analysis logical data mart schema in accordance to one exemplary embodiment of the invention.

FIG. 3 illustrates an example of database schema and their relationships for a data mart for Purchase profile analysis in the retail industry. The schemas consists of four dimension tables—Customer 10, Store 12, Product 14, and Time 16—and a fact table 18, which is the central table in FIG. 3. The fact table 18 stores measures for individual sales transaction, such as Number of Items Sold and Sales Amount. The granularity of the sales data in this data mart is at the sales transaction level (i.e., the Product Id, Store Id, Customer Id, and Time Id level). This transaction data must be aggregated to higher levels of the product and store hierarchies, and time series transformations must be applied in order to make it suitable for predictive modeling.

Step 3 of FIG. 2 is directed to defining/importing existing data warehouse, OLAP, and mining data. In order to automatically generate transformation code, the database schemas and their relationships for the available data must first be specified in machine accessible form. The necessary relational metadata information for star-schemas (such as shown in FIG. 3) can be specified using any of a variety of software tools, such as the Cube views component of IBM DB2 Data Warehouse edition. Cube Views can be used to specify dimensions, hierarchies, fact tables, measures, and their relationships. A Cube Model is a grouping of this object in the context of a business domain.

Figure 4:
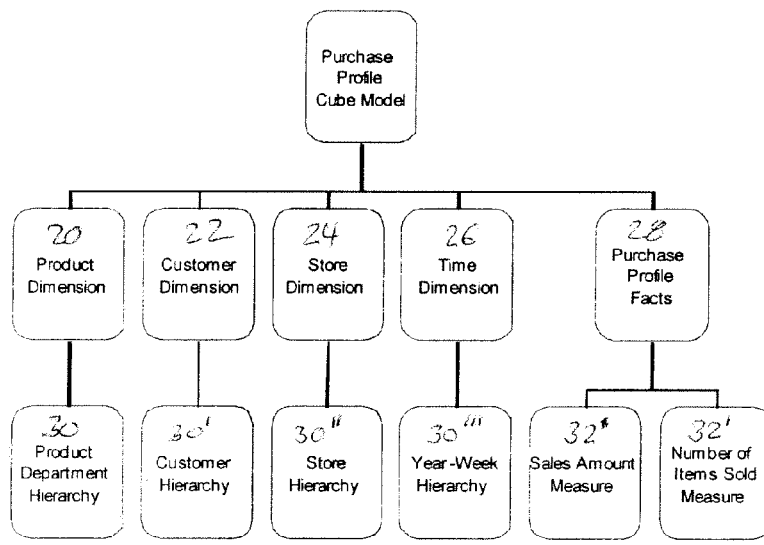
FIG. 4 is a purchase profile analysis cube model which illustrates cube views metadata objects on the purchase profile analysis star schema shown in FIG. 3.

FIG. 4 illustrates Cube Views metadata objects based on the purchase profile analysis star-schema shown in FIG. 3. In FIG. 4, the Purchase Profile Cube Model is composed of four Dimensions (Product 20, Customer 22, Store 24 and Time 26), and a Facts object (Purchase Profile Facts 28). Each Dimension includes a Hierarchy object 30, 30', 30", and 30'", and 32 and 32'. Hierarchy object in Cube Views is composed of ordered list of Level objects (not shown in the figure). For example, Product Dimension includes Product Department Hierarchy object. The Product Department Hierarchy Levels are Product Department, Product Sub-Department, Product Class, Product Sub-Class and Product. The Store Hierarchy Levels are Store Region, Store District and Store. The Year-Week Hierarchy Levels are Year and Week Levels. The Purchase Profile Facts object includes two measures, Sales Amount and Number of Items Sold. The Cube Model provides a platform for constructing additional analytical metadata objects. It encapsulates the relational database schema information (tables, views, keys and their relationship information), and multidimensional metadata objects (Dimensions, Hierarchies, Facts, Measures etc). Mining Transformation Profile (described in more detail below) leverages the information in the Cube Model object for data transformation specification and automatic generation of data transformation code (Example:—SQL).

Step 4 of FIG. 2 pertains to defining a mining transformation profile. For this example, a retail sales forecasting mining profile will be described herein.

FIG. 5 shows an example of a mining transformation profile for the illustrative problem of forecasting future retail sales by item by store. As illustrated by the example in FIG. 5, a mining transformation profile comprises a specification of the key fields for the resulting transformed data and a specification of desired data transformations. In the case of the desired data transformations, it is beneficial to further segregate these into explanatory fields and target fields for reasons discussed below. Explanatory fields are used as inputs to predictive models for generating predictions. Target fields are the fields whose values are to be predicted by the resulting predictive models.

The key fields of a mining transformation profile comprise a specification of a subset of dimensions of star schema and the desired hierarchical levels within those dimensions. Each row of the resulting transformed data will then correspond to a unique combination of values for the key fields. For example, in the case of FIG. 5, the key fields correspond to the Store 12, Product 14, and Time 16 dimensions shown in FIG. 3. The Store and Product key fields are at the lowest hierarchical levels within these dimensions (i.e., the individual store level and individual product level, respectively). The Time key field is at the weekly level. Thus, each row in the resulting transformed data will correspond to a particular product for a particular store for a particular week. The desired data transformations of a mining transformation profile comprise aggregations of measures from a facts table. The aggregations are performed relative to the key fields. For example, in the case of FIG. 5, the first desired data transformation is to calculate the sum of the Number of Items sold for the product at the store during the week specified by the values of the key fields. In other words, from the point of view of SQL code, the transformation is to sum the Number of Items field grouping by the keys of the output table (i.e., Store Id, Product Id, and Week Id). Note that, in general, any of the usual SQL aggregations functions can be employed in expressions that calculate aggregates (e.g., AVG, COUNT, MIN, MAX, SUM, etc.). The remaining data transformations shown in FIG. 5 illustrate how different aggregations can be specified by modifying the levels of aggregation of one or more key fields. A subsequent example presented below (drawn to customer propensity) illustrates levels of aggregation along dimensions other than those defined by the key fields.

The second and third data transformations shown in FIG. 5 are to calculate the sum of the Number of Items sold for the previous week and the cumulative sum from the beginning of the current year up to and including the current week. Because the key fields are Store Id, Product Id, and Week Id, these sums are calculated per store, per product, per week. From the point of view of SQL code, these sums could be calculated using OLAP functions. The fourth data transformation shown in FIG. 5 is to calculate the sum of the Number of Items sold by day of week. Because the desired level of aggregation is lower than the weekly level of aggregation of the Time dimension in the list of key fields, the fourth data transformation actually defines seven output columns, one per day of week. Thus, the data transformation is to sum the Number of Items sold on Mondays per store, per product, per week, on Tuesdays per store, per product, per week, etc. This transformation is sometimes referred to as a pivot operation. From the point of view of SQL code, these sums could be calculated using case expressions inside SUM aggregate functions to selectively sum by the desired day of week. The fifth through eighth data transformations shown in FIG. 5 are the same as the first four, except they are performed at the Product Department level instead of the Product Id level. Thus, the fifth data transformation is to sum the Number of Items sold per store, per week, per the product department to which the Product Id belongs. Likewise for the sixth, seventh, and eighth data transformations. Because many Product Id's can belong to a single Product Department, these data transformation could be efficiently calculated in SQL by first performing the calculations by store, by week, by product department and then performing a join to map the product-department level aggregates back down to the individual products within each department. The ninth through twelfth data transformations shown in FIG. 5 are the same as the first four, except they are performed at the Store District and Product Department levels instead of the Store Id and Product Id level. In this case, these data transformation could be efficiently calculated in SQL by first performing the calculations by store district, by product department by week and then performing a join to map the store-district-product-department level aggregates back down to the individual stores and products within each district and department. The thirteenth through twenty eighth data transformations shown in FIG. 5 are sums of the Number of Items sold for each subsequent week in the future for the next 16 weeks. From the point of view of SQL code, these sums could be calculated using OLAP functions.

These last transformations define the target fields for predictive modeling. When the time dimension maps to a key field, the explanatory fields must refer only to past and present data values. They cannot be allowed to refer to future values. Only target fields should be allowed to refer to future values. The benefit of distinguishing between explanatory fields and target fields during data transformation is to enforce these rules. Violation of these time rules is a common mistake in data mining projects and leads to erroneous results.

Step 5 of FIG. 2 is related to automatically generating data transformation code. An executable code, running on one or more computer(s) or one or more processor(s), can interpret the mining profile information (FIG. 5) and optionally use other data warehouse metadata information such as multidimensional metadata (FIG. 4) and physical data mart information (FIG. 6), to automatically generate another executable code and/or Scripts such as SQL, ETL and/or compliable code such C/C++ to perform the necessary data transformation as defined in the metadata (FIGS. 4, 5, and 6).

Figure 6:
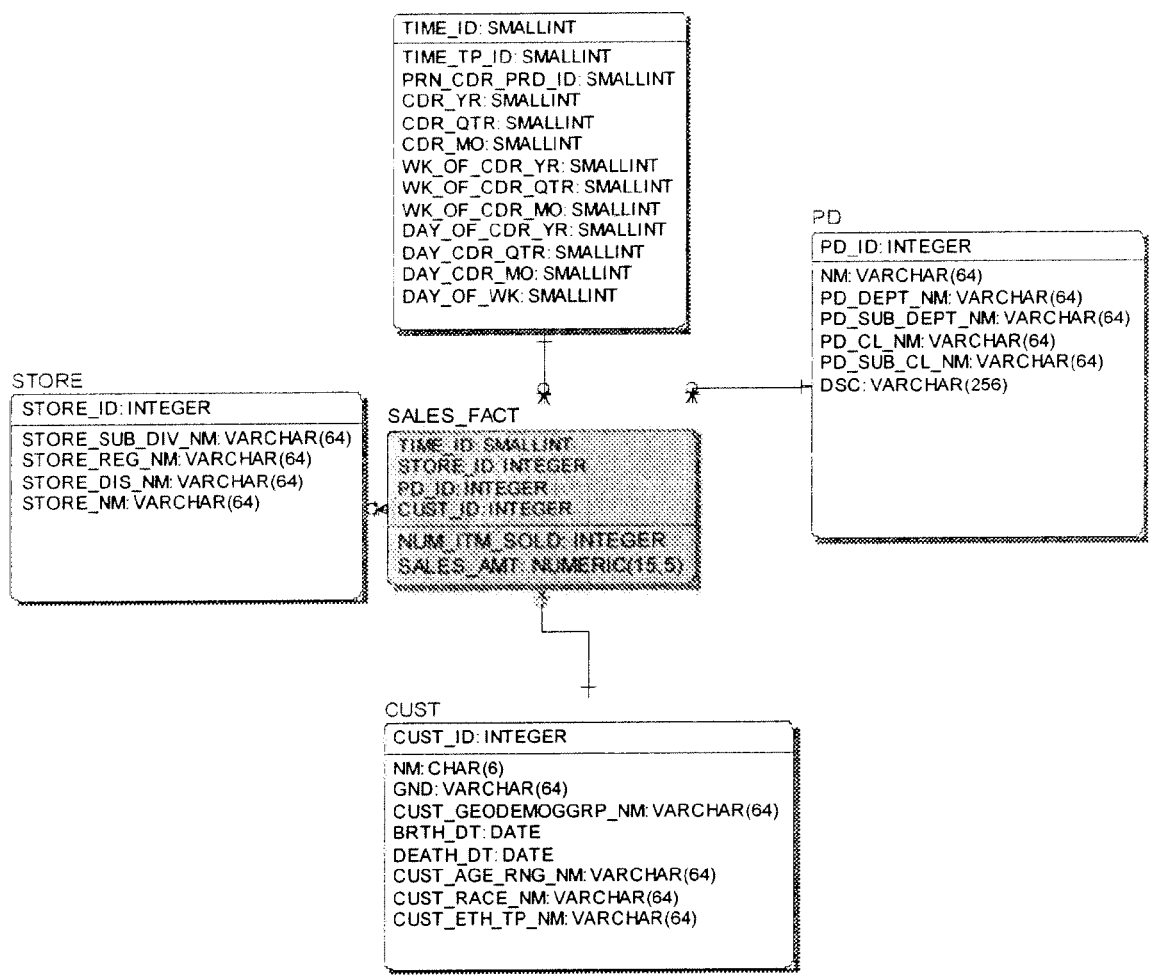
FIG. 6 is a purchase profile analysis physical data mart schema related to FIG. 3.
Figure 10:
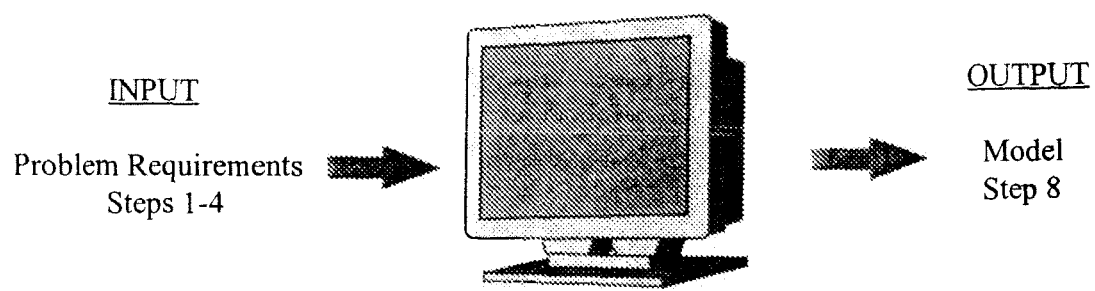
FIG. 10 is a schematic diagram showing inputs and outputs for a computer system which performs processing according to FIG. 2.

FIG. 6 shows a physical data mart schema corresponding to the logical data mart schema in FIG. 3 The physical data mart schema can be generated using existing tools such IBM Rational Data Architect.

FIG. 7 provides SQL code that illustrates an example of data transformation code for retail sales forecasting mining profile. This SQL code makes use of OLAP function provided in DB2 V. 8.1 (and above) on LUW platform.

With reference to FIGS. 7a and 7b, the SQL code in paragraph 1 (marked using the right brace) defines a temporary table using the "With" clause. The purpose of the temporary table is to aggregate all the measures to a granularity defined by the key attribute. The temporary table also calculates the measures that access data at a level lower than the key attribute levels. Additional aggregations, such as window based aggregations, are performed in the primary select clause. The measure "Number of Items Sold" is aggregated to Store Id, Product Id and Week of Calendar Year Level (paragraph 5). The measure "SUM(Number of Items)—by Day-Of-Week" is also calculated in the temporary table because this measure must access data at day level which is lower than the week level defined in the mining profile key attributes (paragraph 2). The hierarchical relationship information required to construct the SQL is stored in the Year-Week hierarchy object in Cube Views. The 'From' clause in the temporary table definition (paragraph 3) is constructed using the dimension and fact table definitions stored in the Cube Model. The "Where" clause (paragraph 4) is constructed using information from the dimension and fact table Join objects in the Cube Model. Paragraph 6, 7, 8 and 9 define the primary "Select, From and Where" clause of the mining data transformation code. The primary select clause includes mining profile key attributes (paragraph 6), Explanatory and Target attributes (paragraph 7) and the "From" clause (paragraph 8). The "From" clause uses the temporary table definition in paragraph 7. The example SQL code is just one of several forms of the data transformation code that can be generated automatically using the mining profile and Cube Model metadata information.

FIG. 8 is drawn to a customer propensity mining profile (as opposed to the retail sales forecasting mining profile discussed above in connection with FIGS. 3-7. FIG. 8 shows an example of a mining transformation profile for the illustrative problem of customer propensity calculations. The first transformation shown in FIG. 8 is a recency calculation (i.e., the time since the most recent purchase made in the last 12 months). The second through fifth transformations shown in FIG. 8 are frequency calculations (i.e., the number of store visits in the last month, three months, six months, and twelve months). The sixth through ninth transformations shown in FIG. 8 are monetary calculations (i.e., total amount purchased in the last month, three months, six months, and twelve months). The tenth data transformation shown in FIG. 8 is a product affinity calculation that measures customer buying preferences by product department. Because the aggregation is over a dimension that does not appear as a key field, the tenth transformation defines a pivot calculation that generates multiple columns, one column per product department. The values are the sums of Sales Amount for each product department over the preceding twelve months, and are calculated per customer, per month as defined by the key fields.

FIGS. 9a and 9b illustrates an example of SQL data transformation code for the Customer Propensity Mining Profile. This SQL code is similar to the one described in FIG. 7. It uses OLAP functions provided in DB2 V 8.1 (and above) on LUW platform. It accesses the metadata information from Cube Model and Mining Transformation Profile. Both the Mining Transformation Profiles, the Retail Sales Forecasting and Customer Propensity, are based on the same Cube Model (Purchase Profile Analysis). Therefore, the Cube Model information is reused to construct the SQL Code.

The temporary table in paragraph 1 calculates "Total Sales Amount by Month" (SUM (FCT.SALES_AMT)), Recency (Last Date in Month for the last 12 Months) and "Frequency" (COUNT (DISTINCT Time Id)) measures to the level defined by the key attributes in FIG. 8. The temporary table also calculates Sales Amount by Department (paragraph 2) by doing unpivot operation on the members of Department level. This is done by using 'CASE' statement. Paragraph 3 defines the primary Select, From and Where clause. It also performance calculations based on the range of rows (SUM(SALES AMOUNT) NEXT MONTH, SUM(SALES AMOUNT) LAST 3 MONTHS, SUM(SALES AMOUNT) LAST 6 MONTHS Etc).

While the invention has been described in terms of its preferred embodiments, those skilled in the art will recognize that the invention can be practiced with modification within the spirit and scope of the appended claims.

The invention claimed is:

1. A process of transforming data residing in databases into forms suitable as input to data analysis tools, the process including the steps of defining a business process problem to be solved and identifying data requirements, the improvement of computer implemented method for automatically transforming data for use in data analysis tools used to build predictive models comprising the steps of:

specifying by a database administrator database metadata information of data to be transformed, said specification encapsulating said database metadata information;

creating by an analyst from said database metadata specification a mining transformation profile comprising a specification of key fields and desired data transformations, said specification being relative to said database metadata information and suitable for use by said data analysis tools to build predictive models;

generating executable data transformation code automatically from the encapsulated database metadata information and the mining transformation profile, execution of said data transformation code producing at least one of said desired transformations aggregated relative to at least one of said key fields for input to one of said data analysis tools; and iteratively executing the data transformation code by said analyst to build a predictive model according to said data analysis tool, the model generating an output that provides a solution to the business process problem, the iterative execution by a computer of said data transformation code replacing repeated interactions between the database administrator and the analyst.

2. The process of claim 1 wherein said data analysis tool is a predictive modeling tool.

3. The process of claim 1 wherein said database is a relational database described by database tables, their interrelationships, dimensional information, hierarchies, fact tables, and measures.

4. The process of claim 1 wherein said step of specifying is performed on a plurality data repositories in a relational database environment.

5. The process of claim 1 wherein said step of creating a mining transformation profile creates a mining transformation profile that refers to and/or reuses relational and multi-dimensional metadata from said database metadata specification.

6. The process of claim 1 wherein said business process problem is to predict future sales of each item at each store in a retail chain.

7. The process of claim 1 wherein said business process problem is to predict a customer's likelihood of making purchases in the future.

8. A system for transforming data residing in databases into forms suitable as input to data analysis tools used to build predictive models, comprising:

a computer;

one or more databases associated with or accessible by said computer, wherein said computer can access database metadata information of data to be transformed for use in data analysis tools that build predictive models; and instructions stored in a computer readable medium which can be read and performed by said computer, said instructions pertaining to defining a business process problem to be solved and identifying data requirements, the instructions coding for a computer implemented method for automatically transforming data for use in said data analysis tools comprising the steps of:

specifying by a database administrator database metadata information of data to be transformed, said specification encapsulating said database metadata information;

creating by an analyst from said database metadata specification a mining transformation profile comprising a specification of key fields and desired data transformations, said specification being relative to said database metadata information and suitable for use by said data analysis tools to build predictive models;

generating executable data transformation code automatically from the encapsulated database metadata information and the mining transformation profile, execution of said data transformation code producing at least one of said desired transformations aggregated relative to at least one of said key fields for input to a data analysis tool; and iteratively executing the data transformation code by said analyst to build a predictive model according to said data analysis tool, the model generating an output that provides a solution to the business process problem, the iterative execution by a computer of said data transformation code replacing repeated interactions between the database administrator and the analyst.

9. The system of claim 8 wherein said business process problem is to predict future sales of each item at each store in a retail chain.

10. The system of claim 8 wherein said business process problem is to predict a customer's likelihood of making purchases in the future.

11. The method of claim 1 further comprising the step of segregating the desired data transformations into explanatory fields and target fields.

12. The system of claim 8 wherein said data analysis tool is a predictive modeling tool.

13. The system of claim 8 wherein said database is a relational database described by database tables, their interrelationships, dimensional information, hierarchies, fact tables, and measures.

14. The system of claim 8 wherein said step of specifying is performed on a plurality data repositories in a relational database environment.

15. The system of claim 8 wherein said step of creating a mining transformation profile creates a mining transformation profile that refers to and/or reuses relational and multi-dimensional metadata from said database metadata specification.

16. The system of claim 8 wherein said step of creating a mining transformation profile further comprises the step of segregating the desired data transformations into explanatory fields and target fields.

17. A system for transforming data residing in databases into forms suitable as input to data analysis tools used to build predictive models, comprising:

a computer;

one or more databases associated with or accessible by said computer, wherein said computer can access database metadata information of data to be transformed for use in said data analysis tools;

instructions stored in a computer readable medium which can be read and performed by said computer, said instructions pertaining to defining a business process problem to be solved and identifying data requirements, the instructions coding for a computer implemented method for automatically transforming data for use in data analysis tools to build predictive models;

a metadata specification encapsulating said database metadata information, said specification being relative to said database metadata information and suitable for use by said data analysis tools;

a mining transformation profile comprising a specification of key fields and desired data transformations, said mining transformation profile being created from said database metadata specification;

executable data transformation code generated automatically from the encapsulated database metadata information and the mining transformation profile, execution of said data transformation code producing at least one of said desired transformations aggregated relative to at least one of said key fields for input to one of said data analysis tools; and a model according to said data analysis tool built by iterative execution of said data transformation code, the model generating an output that provides a solution to the business process problem.

18. The system of claim 17 wherein said database is a relational database described by database tables, their interrelationships, dimensional information, hierarchies, fact tables, and measures.

19. The system of claim 18 wherein said mining transformation profile refers to and/or reuses relational and multidimensional metadata from said database metadata specification.

20. The system of claim 17 wherein the database metadata specification is specified by a database administrator, the mining transformation profile is created by an analyst, and the iterative execution by the computer of the data transformation code replaces repeated interactions between the database administrator and the analyst.

* * * * *